(12) United States Patent
Murakawa et al.

(10) Patent No.: US 6,503,861 B1
(45) Date of Patent: Jan. 7, 2003

(54) DIELECTRIC CERAMIC COMPOSITION, METHOD OF PREPARING DIELECTRIC CERAMIC MATERIAL, AND DIELECTRIC RESONATOR

(75) Inventors: Shunichi Murakawa, Kagoshima (JP); Yoshihiro Okawa, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/481,972

(22) Filed: Jan. 12, 2000

(30) Foreign Application Priority Data

Jan. 14, 1999 (JP) .......................................... 11-008306
Jan. 14, 1999 (JP) .......................................... 11-008307

(51) Int. Cl.$^7$ ..................... C04B 35/462; C04B 35/465
(52) U.S. Cl. ....................... 501/137; 501/134; 501/135; 501/136; 501/138; 501/139; 333/219.1; 361/321.5
(58) Field of Search ................................. 501/134, 135, 501/136, 137, 138, 139; 333/219.1; 361/321.5

(56) References Cited

U.S. PATENT DOCUMENTS

| 5,091,348 A | * | 2/1992 | Woodhead et al. | ......... 501/136 |
| 6,025,291 A | * | 2/2000 | Murakawa et al. | ......... 501/136 |
| 6,126,743 A | * | 10/2000 | Saegusa et al. | ............... 117/68 |

FOREIGN PATENT DOCUMENTS

| JP | 08/077829 | 3/1996 |
| JP | 11-071171 | 3/1999 |
| JP | 11-106255 | 4/1999 |
| JP | 11-130528 | 5/1999 |
| WO | WO98/43924 | 10/1998 |

OTHER PUBLICATIONS

Sun, et al.: "Dielectric Behavior of (1–x)LaA1O3 xSrTiO3 Solid Solution System at Microwave Frequencies" Japanese Journal of Applied Physics, vol. 37, No. 10, –1998, pp. 5625–5629 (No month).

Vanderah, et al.: "Synthesis and Dielectric Properties of Substituted Lanthanum Aluminate", Journal of the American Ceramic Society, vol. 77, No. 12, 1994, pp. 3125–3130 (No month).

* cited by examiner

Primary Examiner—Elizabeth D. Wood
(74) Attorney, Agent, or Firm—Hogan & Hartson, LLP

(57) ABSTRACT

There is provided a dielectric ceramic composition wherein a main crystal phase is a perovskite-type crystal phase, comprising a complex oxide which contains, as a metal element, at least a rare earth element, Al, M (M is Sr, alternatively, Sr and Ca) and Ti, and is represented by the following composition formula:

$$aLn_2O_xbAl_2O_3cMOdBaOeTiO_2$$

wherein Ln is a rare earth element; and a, b, c, d and e is a mole ratio in a predetermined range, and more specifically comprising a solid solution of $LnAlO_{(x+3)/2}$ ($3 \leq x \leq 4$) and $RTiO_3$ (R is an alkaline earth metal containing at least Sr). This composition provides a large dielectric constant $\in r$ and a high Q value in a high frequency region, and also lessens the variation in dielectric constant $\in r$, Q value, and resonance frequency temperature coefficient τf.

10 Claims, 4 Drawing Sheets

DIELECTRIC CERAMIC COMPOSITION, METHOD OF PREPARING DIELECTRIC CERAMIC MATERIAL, AND DIELECTRIC RESONATOR

FIELD OF THE INVENTION

The present invention relates to a dielectric ceramic composition and dielectric resonator which stably control dielectric constant ∈r, resonator acutance Q value and temperature coefficient τf in a high frequency region such as of microwave and millimeter-wave, and which have less variation in these characteristic values. More particularly, the invention relates to a dielectric ceramic composition, a method for preparing a dielectric ceramic material and a dielectric resonator, which are applied for high frequency regions in various resonator materials, dielectric substrate materials for MIC (monolithic IC), dielectric waveguide materials, multilayer ceramic capacitors, and the like.

BACKGROUND OF THE INVENTION

Dielectric ceramic materials are widely utilized in resonator materials, MIC dielectric substrate materials, dielectric waveguides, dielectric antennas, and any of various electronic components, which are employed for microwave and millimeter-wave regions in various equipment such as car telephones, cordless telephones, personal wireless units, and satellite broadcasting receivers. The dielectric ceramic materials are generally required to have the following three principal characteristics:

(i) High dielectric constant to meet a demand for size reduction of devices, because the wavelength of propagating electromagnetic wave is reduced to $1/\in r^{1/2}$ in dielectrics;

(ii) A small dielectric loss in high frequency regions, that is, a high Q value; and (iii) A small change in resonant frequency with respect to a temperature change, that is, a stably low temperature dependency of dielectric constant ∈r.

Exemplary dielectric ceramic materials hitherto known are oxide ceramic materials such as BaO—TiO$_2$ based materials, BaO—REO—TiO$_2$ (wherein REO is an oxide of a rare earth element) based materials, and MgTiO$_3$—CaTiO$_3$ based materials (see Japanese Unexamined Patent Publication Nos. 61-10806/1986 and 63-100058/1988).

Although the BaO—TiO$_2$ based materials have a high dielectric constant ∈r of 37 to 40, and a high Q value on the order of 40,000, it is difficult to attain a resonance frequency temperature coefficient τf of zero in a single phase, and these materials suffer from a great change in the dielectric constant to a composition change, and in the temperature dependency of dielectric constant. Therefore, it is difficult to stably reduce resonance frequency temperature coefficient τf, while maintaining a high dielectric constant and a low dielectric loss.

Known as the BaO—REO—TiO$_2$ based materials are BaO—Nd$_2$O$_3$—TiO$_2$ based materials and BaO—Sm$_2$O$_3$—TiO$_2$ based materials. These materials, however, have an extremely high dielectric constant ∈r of 50 to 80. Some of them have a resonance frequency temperature coefficient τf of zero, however, they have a low Q value on the order of 5,000.

As to the MgTiO$_3$—CaTiO$_3$ based materials, Q value is large on the order of 30,000. Some of them have a resonance frequency temperature coefficient τf of zero, however, their dielectric constants are small of 16 to 25.

Accordingly, any of the above materials does not satisfy the three characteristics (i) to (iii) at the same time, which are required of dielectric materials for high frequency application. Although these materials provide a high Q value in a high frequency region, Q value at a high temperature (120° C.) is reduced considerably than Q value at room temperature (25° C.). Hence, they fail to satisfactorily enjoy the merit of high Q value, thus causing the problem of increasing the insertion loss (IL) of a resonator.

On the other hand, the present applicant has proposed a dielectric ceramic composition which comprises a complex oxide containing a rare earth element, Al, Ca and Ti (see Japanese Unexamined Publication No. 6-76633/1994). This dielectric ceramic composition has excellent features that it has a high dielectric constant of 34 to 46, and a high Q value of over 20,000. On the contrary, during its manufacturing process there is a considerable variation in dielectric constant ∈r, Q value, and resonance frequency temperature coefficient τf. This makes it difficult to stably control these characteristics.

The above dielectric ceramic composition also has the problem that the rate of retention of Q value at a high temperature (120° C.) to Q value at room temperature (25° C.) is insufficient. With the development of communication industry, there is a demand for materials having a higher Q value.

SUMMARY OF THE INVENTION

It is a main object of the present invention to provide a dielectric ceramic composition, a method for preparing a dielectric ceramic material, and a dielectric resonator, which have a large dielectric constant ∈r, high Q value and low resonance frequency temperature dependency, and which have less variation in dielectric constant ∈r, Q value and resonance frequency temperature coefficient τf, thereby to stably control these characteristic values.

It is another object of the invention to provide a dielectric ceramic composition for high frequency application which can maintain a high retention of Q value at 120° C., to Q value at room temperature (25° C.), as well as a dielectric resonator using this composition.

According to the invention, there is provided a dielectric ceramic composition wherein a main crystal phase is a perovskite-type crystal phase. This composition comprises a complex oxide which contains, as a metal element, at least a rare earth element (Ln); Al; Sr, alternatively, Sr and Ca; and Ti, and which is represented at a mole ratio by the following composition formula:

$$aLn_2O_x bAl_2O_3 cMO dBaO eTiO_2 \qquad (1)$$

wherein M is Sr, alternatively, Sr and Ca; and $3 \leq x \leq 4$, a, b, c, d and e satisfying the following equations:

$0.056 \leq a \leq 0.450$;

$0.056 \leq b \leq 0.450$;

$0.100 \leq c \leq 0.500$;

$0 \leq d \leq 0.100$;

$0.100 < e < 0.470$;

$0.75 \leq b/a \leq 1.25$;

$0.75 \leq e/(c+d) \leq 1.25$; and $a+b+c+d+e=1$

This composition enables to obtain a large dielectric constant ∈r and high Q value, and to lessen variations in dielectric constant ∈r, Q value and resonance frequency temperature coefficient τf, thereby to provide a dielectric ceramic material capable of stably controlling these characteristic values. That is, the composition of the invention has accomplished from the point of view of that control of the main crystal phase in a dielectric ceramic composition is important in order to reduce and stably control the variation of dielectric characteristics.

The dielectric ceramic composition preferably comprises a complex oxide which contains, as a metal element, at least La, Al, Sr and Ti, and which is represented at a mole ratio by the following composition formula:

$$aLa_2O_3bAl_2O_3cSrOeTiO_2 \quad (2)$$

wherein a, b, c and e satisfy the following equations:
  $0.1061 \leq a \leq 0.2162$;
  $0.1050 \leq b \leq 0.2086$;
  $0.3040 \leq c \leq 0.4185$;
  $0.2747 \leq e \leq 0.4373$;
  $0.75 \leq b/a \leq 1.25$;
  $0.75 \leq e/c \leq 1.25$; and
  $a+b+c+e=1$ By using La and Sr together, it is possible to form a solid solution of $LaAlO_3$ and $SrTiO_3$, thereby to improve Q value.

Preferably, a dielectric ceramic composition of the invention is substantially composed of a single crystal phase of a perovskite-type crystal phase. It is more preferable that the perovskite-type crystal phase be composed of a solid solution which comprises at least $LnAlO_{(x+3)/2}$ (Ln is a rare earth element, and $3 \leq x \leq 4$), and $RTiO_3$ (R is an alkaline earth metal containing at least Sr).

Thus, a still higher Q value is obtainable by a dielectric ceramic composition comprising a complex oxide which contains, as a metal element, at least La, Al, Sr and Ti, and which has a solid solution of $LaAlO_3$ and $SrTiO_3$, as a main crystal phase.

A method of preparing a dielectric ceramic material of the invention is characterized in that a calcined powder of which main crystal phase is $LnAlO_{(x+3)/2}$ ($3 \leq x \leq 4$), and a calcined powder of which main crystal phase is $RTiO_3$ (R is an alkaline earth metal containing at least Sr) are blended, molded and fired.

With this method, the solid dissolution between the two calcined powder is facilitated, thereby to obtain a dielectric ceramic material of a single crystal phase which is substantially composed of a complex oxide crystal phase of a perovskite-type ($ABO_3$ type).

The present invention also provides a dielectric ceramic composition which contains Mn, in terms of $MnO_2$, in an amount of 0.01 to 3 parts by weight, to 100 parts by weight of a main composition represented by the composition formula (1), particularly, the composition formula (2).

This composition enables to stabilize Q value and to increase the rate of retention of Q value at a high temperature (120° C.) to Q value at room temperature (25° C.), thereby to increase no-load Q of a resonator.

According to the present invention, a dielectric resonator be operated by electromagnetic coupling comprises a dielectric ceramic material and a pair of input and output terminals disposed on the sides of the dielectric ceramic material, and the dielectric material comprising the dielectric ceramic composition as described. This enables to provide a resonator having excellent stability of no-load Q and resonance frequency.

Other objects and advantages of the present invention will become apparent from the following detailed description.

DETAILED DESCRIPTION OF THE INVENTION

Figure 1:
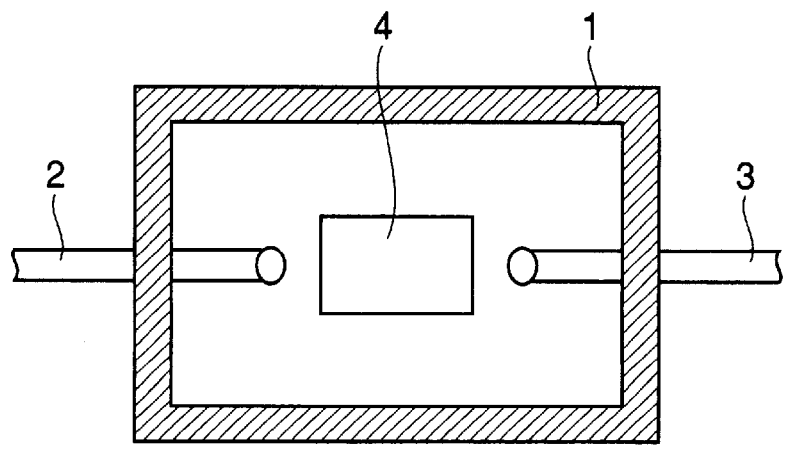
FIG. 1 is a schematic diagram illustrating a dielectric resonator according to the invention.
Figure 2:
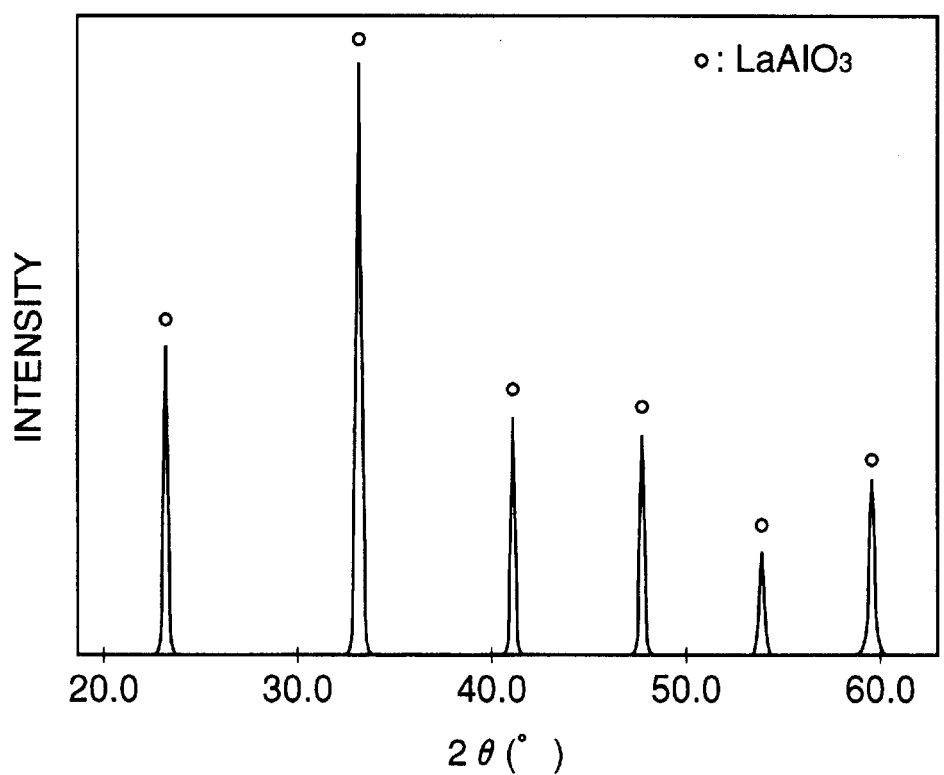
FIG. 2 is an X-ray diffraction chart of a calcined powder of $LaAlO_3$ in an example of the invention.
Figure 3:
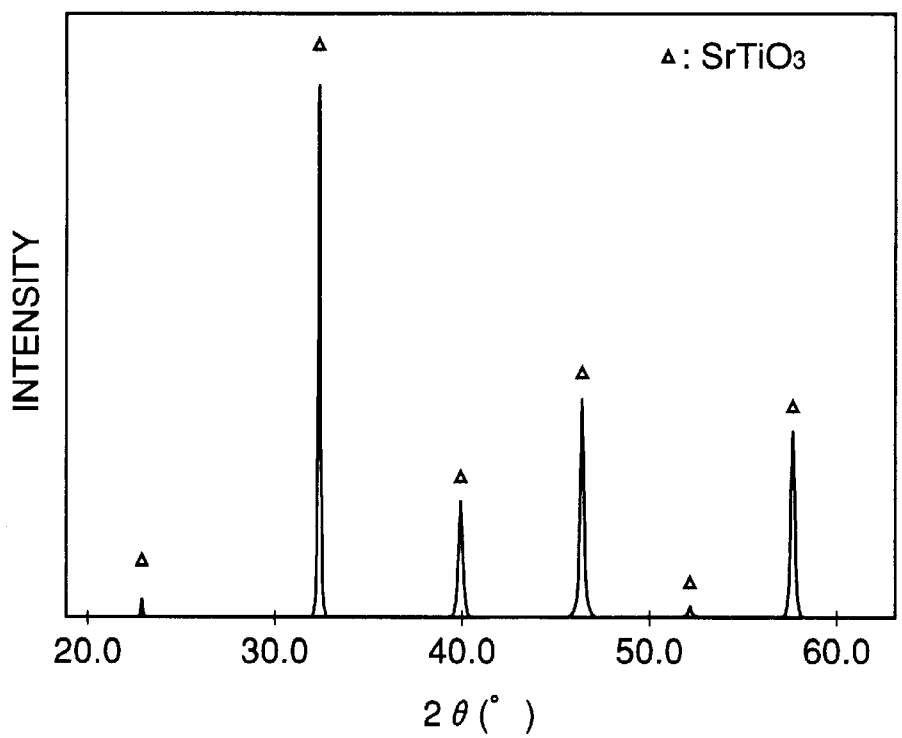
FIG. 3 is an X-ray diffraction chart of a calcined powder of $SrTiO_3$ in the example.

A dielectric ceramic composition according to one preferred embodiment of the invention comprises a complex oxide which contains at least a rare earth element (Ln); Al; Sr; alternatively, Sr and Ca; and Ti, and which has a perovskite-type crystal phase as a main crystal phase. The ceramic composition maybe in powder, alternatively, amass body (ceramic body) which is obtained by molding the composition into a specific shape, followed by firing.

The main crystal phase can be examined by analyzing a dielectric ceramic composition with X-ray diffraction. In the invention the feature that a perovskite-type crystal phase is the main crystal phase means that based on the X-ray diffraction, the main peak of a crystal phase comprising the solid solution is higher than that of other crystal phase. Especially, it is desirable that the ceramic composition is substantially composed of the perovskite-type crystal phase alone. It is further desirable in reducing the variations of dielectric characteristic values that the perovskite-type crystal phase is composed of a solid solution represented by (Ln, R) (Al, Ti) $O_3$ which comprises at least $LnAlO_{(x+3)/2}$ ($3 \leq x \leq 4$) and $RTiO_3$ (R is an alkaline earth metal containing at least Sr).

When an oxide of the respective metal elements is represented by the following composition formula:

$$aLn_2O_xbAl_2O_3cMOdBaOeTiO_2 \quad (1)$$

wherein Ln, M and x are as defined above, it is essential that the mole ratios, a, b, c, d and e, satisfy the following equations:
  $0.056 \leq a \leq 0.450$;
  $0.056 \leq b \leq 0.450$;
  $0.100 \leq c \leq 0.500$;
  $0 \leq d \leq 0.100$;
  $0.100 \leq e \leq 0.470$;
  $0.75 \leq b/a \leq 1.25$;
  $0.75 \leq e/(c+d) \leq 1.25$; and
  $a+b+c+d+e=1$ The reason why the quantity of each metal element is limited to the above range is as follows.

The definition of $0.056 \leq a \leq 0.450$ is due to the facts that when a<0.056, τf increases toward the positive side, and Q value decreases; and that when a >0.450, dielectric constant ∈r decreases, Q value decreases, and τf increases toward the negative side. Most preferred is $0.078 \leq a \leq 0.325$.

The definition of $0.056 \leq b \leq 0.450$ is due to the facts that when b<0.056, τf increases toward the positive side, and Q value decreases; and that when b>0.450, Q value decreases. Most preferred is 0.078≦b≦0.325.

The definition of 0.100≦c≦0.500 is due to the facts that when c<0.0100, Q value decreases, and τf increases toward the negative side; and that when c>0.500, τf increases toward the positive side, and Q value decreases. Most preferred is 0.250≦a≦0.47.

The definition of 0≦d≦0.100 is due to the fact that when d>0.100, Q value decreases.

The definition of 0.100<e<0.470 is due to the facts that when e≦0.100, τf increases toward the negative side, and Q value decreases; and that when e≧0.470, τf increases toward the positive side, and Q value decreases. Most preferred is 0.250≦e≦0.422.

The definition of 0.75≦b/a≦1.25 is due to the facts that when b/a<0.75, Q value decreases; and that when b/a>1.25, Q value decreases. Most preferred is 0.80≦b/a≦1.20.

The definition of 0.75≦e/(c+d)≦1.25 is due to the facts that when e/(c+d)<0.75, Q value decreases; and that when e/(c+d)>1.25, Q value decreases. Most preferred is 0.80≦e/(c+d)≦1.20.

According to the invention, a still higher Q value is achievable when a dielectric ceramic composition comprises a complex oxide which contains at least La, Al, Sr and Ti, as a metal element, and is represented at a mole ratio by the following composition formula:

$$aLa_2O_3 bAl_2O_3 cSrO eTiO_2 \qquad (2)$$

wherein a, b, c and e satisfy the following equations:

0.1061≦a≦0.2162;

0.1050≦b≦0.2086;

0.3040≦c≦0.4185;

0.2747≦e≦0.4373;

0.75≦b/a≦1.25;

0.75≦e/c≦1.25; and a+b+c+e=1, and, when a solid solution of LaAlO$_3$ and SrTiO$_3$ is a main crystal phase.

Consequently, the dielectric ceramic composition of the invention has a large dielectric constant ∈r and a high Q, and causes less variation in dielectric constant ∈r, Q value and resonance frequency temperature coefficient τf, thereby to allow for their stable control.

As a method of preparing a dielectric ceramic material of the invention, there are, for example, a method in which various metal oxide powder forming a dielectric ceramic material are blended in a predetermined ratio, then molded and fired (hereinafter referred to as a first preparation method); and a method in which various metal oxide powder forming a dielectric ceramic material are divided into at least two groups, the mixtures of the metal oxides are calcined and milled per group, and the milled bodies are blended, molded and fired (hereinafter referred to as a second preparation method).

Of these, the second preparation method is preferred in order to especially facilitate preparation of the solid solution of a metal oxide in a dielectric ceramic material and to obtain a single crystal phase.

In the second preparation method, a calcined powder of which main crystal phase is LnAlO$_{(x+3)/2}$ (3≦x≦4) which contains a rare earth element (Ln) and Al, and a calcined powder of which main crystal phase is RTiO$_3$ (R is an alkaline earth metal containing at least Sr, and this definition shall apply hereinafter) are blended, molded and fired. Specifically, a calcined powder obtainable by calcing and milling a mixture of a rare earth element oxide and Al oxide; and a calcined powder obtainable by calcing and milling a mixture of an alkaline earth metal oxide containing at least SrO, and Tio$_2$ are prepared; and both powder are blended, molded into a predetermined shape, and fired.

This method enables to provide a dielectric ceramic material, the main crystal phase of which is a solid solution of the LnAlO$_{(x+3)/2}$ and RTiO$_3$, that is, a perovskite-type crystal phase represented by (Ln, R) (Al, Ti)O$_3$. This dielectric ceramic material has the advantage to reduce the variation in the characteristic values of ∈r, Q value and τf. As an alkaline earth metal other than Sr, there are for example Ca and Ba.

The reason why the variation in the characteristic values is reduced by the second preparation method seems to be due to the following facts.

In general, the raw material of a dielectric ceramic composition contains impurities, water and the like. In addition, during the manufacturing process, the impurities may be eluted in the form of ions into a solvent such as water, or precipitated in a slurry, alternatively, a heavy element may be exhausted during spray drying, thus causing a composition change. Therefore, even with a high accurate compounding, it is difficult to precisely control the ratio of the respective constituents of Ln, Al, Sr, Ca, Ba and Ti. This results in variation in characteristic values.

Whereas in the second preparation method, the blending of the calcined powder in the above combination allows for precise control of the ratio of the respective constituents, thus enabling to reduce the variation in characteristic values.

More specifically, the second preparation method comprises the following steps of (1) to (7):

(1) At least a rare earth element (Ln) oxide (Ln$_2$O$_3$) powder and an aluminum oxide (Al$_2$O$_3$) powder, each having a high purity, are used as a starting material. The starting material is weighed so as to be a predetermined ratio, particularly, a mole ratio of 0.75≦Al$_2$O$_3$/Ln$_2$O$_3$≦1.25. A pure water is added thereto, and then blended and milled in wet process by means of a ball-milling treatment using zirconia balls, etc. for 1 to 100 hours, until the mixture has a mean particle diameter of 2.0 μm or smaller;

(2) This mixture is dried, calcined at 1000 to 1300° C. for 1 to 10 hours, and milled, resulting in a calcined powder of which main crystal phase is LnAlO$_{(x+3)/2}$ (wherein Ln is a rare earth element, and 3≦x≦4);

(3) Separately, as a starting material, powder of carbonate of an alkaline earth metal containing at least Sr, which is capable of generating an oxide (RO) of an alkaline earth metal (R) by heat treatment (e.g., calcium carbonate, strontium carbonate or barium carbonate), and powder of titanium oxide (TiO$_2$) are weighed so as to have a predetermined ratio, particularly, a mole ratio of 0.75≦TiO$_2$/RO≦1.25. A pure water is added thereto, and then blended and milled in wet process by means of a ball-milling treatment using zirconia balls, etc. for 1 to 100 hours, until the mixture has a mean particle diameter of 2.0 μm or smaller;

(4) This mixture is dried, calcined at 1000 to 1300° C. for 1 to 10 hours, and milled, resulting in a calcined powder of which main crystal phase is RTiO$_3$;

(5) Subsequently, the resultant calcined powder of which main crystal phase of which is LnAlO$_{(x+3)/2}$, and the resultant calcined powder of which main crystal phase is RTiO$_3$ are blended at a predetermined ratio. The obtained mixture is blended and milled in wet process by means of a ball-milling treatment using zirconia balls, etc. for 1 to 100 hours, until the mixture has a mean particle diameter of 2.0 μm or smaller;

(6) To the resultant powder, an organic binder for molding is added in an amount of 3 to 10% by weight, which is then dehydrated and granulated by means of spray drying or the like. The granulated body is molded into a given shape by any known molding means, such as mold pressing, cold isostatic pressing or extrusion molding; and (7) The resultant molding body thus obtained is fired in the air atmosphere at a temperature of 1400 to 1700° C. for 1 to 10 hours, thereby to prepare a dielectric ceramic material of which main crystal phase is a solid solution of $LnAlO_{(x+3)/2}$ and $RTiO_3$.

With the second preparation method as described, the crystal phase is substantially composed of a solid solution of $LnAlO_{(x+3)/2}$ and $RTiO_3$, that is, a single phase of a perovskite-type crystal phase represented by (Ln, R) (Al, Ti)$O_3$. This enables to prepare a dielectric ceramic material having excellent stability of dielectric constant $\in$r, Q value and τf.

Examples of the rare earth element (Ln) are Y, La, Ce, Pr, Sm, Eu, Gd, Dy, Er, Yb, and Nd. The oxide of such a rare earth element (Ln) is in the form of, for example, $Ln_2O_x$ ($3 \leq x \leq 4$). Of these rare earth elements, Y, La, Sm, Gd, Dy, Er, Yb and Nd are preferred, and La and Nd are especially preferred.

Using the above dielectric ceramic composition as a main constituent, ZnO, NiO, $SnO_2$, $CO_3O_4$, $ZrO_2$, $WO_3$, $LiCO_3$, $Rb_2CO_3$, $Sc_2O_3$, $V_2O_5$, CuO, $SiO_2$, $MgCO_3$, $Cr_2O_3$, $B_2O_3$, $GeO_2$, $Sb_2O_5$, $Nb_2O_5$, or $Ta_2O_5$ may be added thereto. These can be added, depending on the kind, in an amount of not more than 6 parts by weight to 100 parts by weight of the main constituent.

Description will now be made of other preferred embodiment of the invention. According to this embodiment, a dielectric ceramic composition for high frequency application comprises a complex oxide and Mn. The complex oxide is served as a main composition, and contains at least La, Al, Sr and Ti as a metal element. Mn is contained, in terms of $MnO_2$, in an amount of 0.01 to 3 parts by weight, to 100 parts by weight of the main composition.

The main composition preferably has the above composition formula (1), particularly, formula (2), on the basis of mole ratio. When the main composition is represented by the formula (2), it is essential that a, b, c and e in the formula satisfy the following equations:

$0.1061 \leq a \leq 0.2162$;

$0.1050 \leq b \leq 0.2086$;

$0.3040 \leq c \leq 0.4185$;

$0.2747 \leq e \leq 0.4373$;

$0.75 \leq b/a \leq 1.25$; and $0.75 \leq e/c \leq 1.25$ wherein a+b+c+e=1.

The presence of Mn in the main composition enables to stabilize Q value without any variation in dielectric constant $\in$r and the of resonance frequency temperature coefficient τf, and to minimize a reduction in Q value at a high temperature (120° C.) to Q value at room temperature (25° C.).

It is more preferable that a, b, c and e in the above formula are within the following ranges, respectively:

$0.1211 \leq a \leq 0.1450$;

$0.1211 \leq b \leq 0.1623$;

$0.3377 \leq c \leq 0.3789$;

$0.3377 \leq e \leq 0.3789$;

$0.85 \leq b/a \leq 1.15$; and $0.85 \leq e/c \leq 1.15$

The reason why the Mn content is defined, in terms of $MnO_2$, in the range of 0.01 to 3 parts by weight, is that when it exceeds 3 parts by weight, Q value decreases sharply, and resonance frequency temperature coefficient τf shifts to the positive side. When the Mn content is below 0.01 part by weight in terms of $MnO_2$, there is little effect. In order to improve dielectric characteristics, the Mn content is more preferably in the range of 0.05 to 2 parts by weight in terms of $MnO_2$.

Further, in order to minimize a reduction in Q value at a high temperature (120° C.) to Q value at 25° C., the carbon content in the entire amount of the composition is preferably not more than 0.02 part by weight, more preferably not more than 0.01 part by weight.

When an organic binder for molding is added in an usual process of preparing ceramic material, carbon is usually incorporated in the ceramic material in an amount of about 0.04% by weight. In order that the carbon content is reduced to 0.02% by weight or less, a molding body containing an organic binder may be subjected to heat treatment under an oxidizing atmosphere, e.g., the atmosphere, at 600° C. or higher for 10 hours or more, especially at 800° C. or higher for 15 hours or more.

Q value at 120° C. can be maintained at 75% or higher of value at 25° C., by controlling the carbon content so as to fall within the above range.

The dielectric ceramic material of this embodiment can be obtained, for example, by the first or second preparation method mentioned above. Preparation of a dielectric ceramic material according to this embodiment will be described based on the first preparation method.

As a starting material, there are used the respective powder of lanthanum oxide, aluminum oxide, strontium carbonate and titanium oxide, each having a high purity. The starting material are weighed so as to have the desired ratio as described. A pure water is added thereto, and then blended and milled in wet process by means of milling using zirconia balls, etc. for 10 to 30 hours, until the mixture has a mean particle diameter of 2.0 μm or smaller;

Subsequently, this mixture is dried and calcined at 1000 to 1300° C. for 2 to 10 hours. To the calcined body, $MnO_2$ is added in an amount falling within the specified range, which is then blended and milled. An organic binder for molding is added in a given amount, e.g., about 5% by weight, and granulated. The resultant powder is molded into an arbitrary shape by means of a desired means, such as, mold pressing, cold isostatic pressing, or extrusion molding. Subsequently, a binder-removing treatment is conducted under an oxidizing atmosphere, e.g., the atmosphere, at a temperature of 600° C. or higher, and a holding time of 10 hours or more. The resultant molding body is then fired in the atmosphere at 1500 to 1700° C. for 1 to 10 hours, thereby to prepare a dielectric ceramic material.

As a starting material of La, Al, Sr and Ti, it is possible to use any compound other than oxides, which can generate an oxide by heat treatment in an oxidizing atmosphere. For example, there are carbonate, acetate, nitrate and hydroxide.

In some cases, a dielectric ceramic material may contain obligatory impurities such as Ca, Zr, Si, Ba, etc. However, even when these impurities are contained in an amount of about 0.1% by weight, as an oxide, no characteristic problem will occur.

The dielectric ceramic composition of the invention is most suitably used as a dielectric ceramic material of a dielectric resonator. A schematic diagram of a TE mode type dielectric resonator is shown in FIG. 1. The dielectric resonator of FIG. 1 comprises an input terminal 2 and output terminal 3 that are disposed on opposite sides in a metal case 1, and a dielectric ceramic material 4 that is composed of the above dielectric ceramic composition and disposed between the input and output terminals 2 and 3. In this TE mode type dielectric resonator, microwaves are inputted from the input terminal 2, and the microwaves are confined within the dielectric ceramic material 4, due to the reflection of the boundary between the dielectric ceramic material 4 and a free space, thereby causing resonance at a specific frequency. Signals generated at this time are electromagnetically coupled to the output terminal 3, and then outputted.

Alternatively, a dielectric ceramic composition of the invention is, of course, applicable to TEM-mode coaxial resonators and strip line resonators, TM-mode dielectric ceramic resonators, and other resonators, all of which are not shown. Alternatively, a dielectric resonator may be constructed by directly attaching the input and output terminals 2 and 3 to the dielectric ceramic material 4.

The dielectric ceramic material 4, which is a resonator medium composed of a dielectric ceramic composition of the invention, is in a predetermined shape, for example, rectangular solid, cube, plate, disk, cylinder, polygonal column, or any other solid shape which allows for resonance. It is desirable in practice that the frequency of a high frequency signal inputted is from about 1 GHz to about 300 GHz, and the resonance frequency is from about 10 GHz to about 100 GHz.

Thus, the use of the dielectric ceramic composition in the dielectric resonator of the invention enables to improve the stability of non-load Q and resonance frequency, as wells as the temperature stability of resonance frequency.

EXAMPLES

The dielectric ceramic composition of the present invention will hereinafter be described in detail by way of examples thereof. It should be understood that the invention is not limited to these examples.

Example 1

Based on the second preparation method as previously described, dielectric ceramic materials were prepared through the following steps (1) to (7):

(1) Powder of a rare earth element (Ln) oxide $Ln_2O_x$ ($3 \leq x \leq 4$) and powder of aluminum oxide ($Al_2O_3$), each having a 99% purity or higher, were used as a starting material. These starting materials were weighed so as to have the mole ratio shown in Table 1. A pure water was added thereto and blended, which was further blended and milled in wet process by means of a ball-milling treatment until the mixture had a mean particle diameter of 2.0 μm or smaller.

As an oxide $Ln_2O_x$ of a rare earth element, $Y_2O_3$, $La_2O_3$, $CeO_2$, $Pr_6O_{11}$, $Sm_2O_3$, $Eu_2O_3$, $Gd_2O_3$, $Dy_2O_3$, $Er_2O_3$, $Yb_2O_3$ and $Nd_2O_3$ were previously prepared.

(2) The resultant milled body was dried, calcined at 1200° C. for two hours, and milled, thereby to obtain a calcined powder A, the main crystal phase of which was $LnAlO_{(x+3)/2}$ ($3 \leq x \leq 4$), having a mean particle diameter of 0.4 to 1.5 Mm.

(3) Separately, the respective powder of calcium carbonate ($CaCO_3$), strontium carbonate ($SrCO_3$), barium carbonate ($BaCO_3$) and titanium oxide ($TiO_2$), as a starting material, were weighed so as to have the mole ratio shown in Table 1. A pure water was added thereto and blended. The mixture was then blended and milled in wet process by means of a ball-milling treatment until the mixture had a mean particle diameter of 2.0 μm or smaller.

(4) The milled body obtained in the step (3) was calcined at 1200° C. for two hours, and then milled, thereby to obtain a calcined powder B, the main crystal phase of which was $RTiO_3$, having a mean particle diameter of 0.4 to 1.5 μm.

(5) The calcined powder A obtained in the step (2) and calcined powder B obtained in the step (4) were blended together with a pure water. This mixture was blended and milled in wet process by means of a ball-milling treatment until it had a mean particle diameter of 2.0 μm or smaller.

(6) To the resultant slurry, a 5% by weight of an organic binder for molding was added and granulated by means of spray drying.

(7) The resultant granulated body was press-molded into a disk, at a pressure of about 1 ton/cm², and then fired in the air atmosphere at a temperature of 1400 to 1700° C. for two hours, thereby to prepare a dielectric ceramic material.

Each of the dielectric ceramic materials was subjected to an X-ray diffraction, showing that every sample was one which has, as a main crystal phase, a perovskite-type crystal phase composed of a solid solution of $LnAlO_{(x+3)/2}$ and $RTiO_3$.

Each disk part (the main surface) of the resultant ceramic materials was subjected to a surface grinding and to an ultrasonic cleaning in acetone, followed by drying at 150° C. for one hour. At a measuring frequency of 3.5 to 4.5 GHz in a cylinder resonator method, the dielectric constant ∈r, Q value and resonance frequency temperature coefficient τf were measured with respect to 30 samples, and each mean value was calculated. The Q value was converted to Q value at 1 GHz, on the basis of the following relation:

(Q value)×(Measuring frequency f)=Constant which has generally been established for microwave dielectric materials. The resonance frequency temperature coefficient τf was measured in the temperature range of −40 to 85° C.

The same test as above was carried out 30 times by using the same starting materials as described. There were prepared 30 samples per test, which were regarded as one lot. The mean value of the dielectric constant ∈r, Q value and resonance frequency temperature coefficient τf were calculated per lot. By using 30 lots, the standard deviation σ of each characteristic value was calculated from the following equation:

$$\sigma = \{\Sigma(w-y)^2/(n-1)\}^{1/2}$$

wherein w is the mean value of the ∈r, Q value or τf, with respect to 30 samples of each lot; y is the value obtained by dividing the sum of the ∈r, Q value or τf of each lot by 30; and n=30. The results are shown in Tables 1 to 3. The mean value of the ∈r, Q value or τf indicated in Tables 1 to 3, corresponds to the value of y.

Separately, Comparative Examples were prepared as follows. That is, the respective powder of a rare earth element oxide $Ln_2O_x$ ($3 \leq x \leq 4$), aluminumoxide ($Al_2O_3$), calciumcarbonate ($CaCO_3$), strontium carbonate ($SrCO_3$), barium carbonate ($BaCO_3$) and titanium oxide ($TiO_2$) were blended at the same time, which was then milled, dried, calcined, granulated, fired and ground, thereby to prepare dielectric ceramic materials. The same test as above was conducted for the resultant samples. The results are indicated by Sample Nos. 40 to 55 in Table 2, and Nos. 83 to 87 in Table 3.

TABLE 1

| | | Ratio of Ca:Sr | | Ln₂O x | Al₂O₃ | MO | BaO | TiO₂ | | e/ | Mean Value | | τf ppm/ | Standard Deviation σ | | τf ppm/ |
|---|---|---|---|---|---|---|---|---|---|---|---|---|---|---|---|---|
| No. | Rare Earth Element Ratio | Ca | Sr | a | b | c | d | e | b/a | (c + d) | εr | Q | °C. | εr | Q | °C. |
| 1 | Y | 0.00 | 1.00 | 0.0800 | 0.0800 | 0.4300 | 0.0100 | 0.4000 | 1.000 | 0.909 | 44.6 | 28000 | 24.9 | 0.25 | 2900 | 0.59 |
| 2 | 0.1Y·0.9Nd | 0.50 | 0.50 | 0.1240 | 0.1300 | 0.3730 | 0.0000 | 0.3730 | 1.048 | 1.000 | 34.8 | 48000 | −28.1 | 0.24 | 2100 | 0.55 |
| 3 | La | 0.80 | 0.20 | 0.2250 | 0.1250 | 0.2750 | 0.0000 | 0.2750 | 1.000 | 1.000 | 40.0 | 50000 | 1.0 | 0.20 | 2200 | 0.65 |
| 4 | Nd | 0.40 | 0.60 | 0.1250 | 0.1260 | 0.3137 | 0.0193 | 0.4160 | 1.008 | 1.249 | 35.8 | 22000 | −17.5 | 0.27 | 2600 | 0.69 |
| 5 | 0.1La·0.9Nd | 0.90 | 0.10 | 0.1250 | 0.1250 | 0.4170 | 0.0000 | 0.3330 | 1.000 | 0.799 | 42.2 | 48000 | −15.4 | 0.29 | 2500 | 0.70 |
| 6 | 0.5La·0.5Nd | 0.30 | 0.70 | 0.3500 | 0.3500 | 0.1500 | 0.0000 | 0.1500 | 1.000 | 1.000 | 32.4 | 59000 | −27.2 | 0.29 | 2900 | 0.70 |
| 7 | Ce | 0.50 | 0.50 | 0.1139 | 0.1061 | 0.3300 | 0.1000 | 0.3500 | 0.932 | 0.814 | 38.9 | 30000 | −1.8 | 0.27 | 3000 | 0.61 |
| 8 | 0.1Ce·0.9Nd | 0.50 | 0.50 | 0.0881 | 0.0881 | 0.3119 | 0.1000 | 0.4119 | 1.000 | 1.000 | 42.4 | 29000 | 10.6 | 0.29 | 2400 | 0.63 |
| 9 | Pr | 0.10 | 0.90 | 0.0560 | 0.0650 | 0.4954 | 0.0000 | 0.3836 | 1.161 | 0.774 | 45.9 | 45000 | 29.7 | 0.20 | 2300 | 0.67 |
| 10 | 0.1Pr·0.9Nd | 0.50 | 0.50 | 0.0941 | 0.1009 | 0.4600 | 0.0000 | 0.3450 | 1.072 | 0.750 | 40.6 | 21000 | 27.5 | 0.24 | 2800 | 0.54 |
| 11 | 0.5Pr·0.5Nd | 0.70 | 0.30 | 0.0770 | 0.0770 | 0.4200 | 0.0100 | 0.4160 | 1.000 | 0.967 | 46.8 | 42000 | 28.6 | 0.22 | 2400 | 0.53 |
| 12 | Sm | 0.20 | 0.80 | 0.0700 | 0.0560 | 0.4240 | 0.0000 | 0.4500 | 0.800 | 1.061 | 47.9 | 21000 | 20.4 | 0.22 | 2600 | 0.57 |
| 13 | 0.1Sm·0.9Nd | 0.80 | 0.20 | 0.1320 | 0.1600 | 0.3270 | 0.0000 | 0.3810 | 1.212 | 1.165 | 45.2 | 50000 | −5.4 | 0.25 | 3000 | 0.62 |
| 14 | 0.5Sm·0.5Nd | 0.50 | 0.50 | 0.1071 | 0.1090 | 0.3539 | 0.0000 | 0.4300 | 1.018 | 1.215 | 37.8 | 42000 | 10.3 | 0.29 | 2800 | 0.68 |
| 15 | Eu | 0.50 | 0.50 | 0.0600 | 0.0600 | 0.5000 | 0.0000 | 0.3800 | 1.000 | 0.760 | 37.0 | 22000 | 15.4 | 0.30 | 2900 | 0.57 |
| 16 | 0.1Eu·0.9Nd | 0.40 | 0.60 | 0.1400 | 0.1150 | 0.3350 | 0.0200 | 0.3300 | 1.250 | 0.930 | 34.1 | 25000 | −15.6 | 0.24 | 2400 | 0.58 |
| 17 | Gd | 0.20 | 0.80 | 0.0600 | 0.0600 | 0.4105 | 0.0000 | 0.4695 | 1.000 | 1.144 | 34.3 | 24000 | 18.1 | 0.21 | 2100 | 0.55 |
| 18 | 0.1Gd·0.9Nd | 0.80 | 0.20 | 0.0780 | 0.0780 | 0.4220 | 0.0000 | 0.4221 | 1.000 | 1.000 | 42.5 | 52000 | 20.4 | 0.28 | 2600 | 0.63 |
| 19 | DY | 0.50 | 0.50 | 0.1166 | 0.1166 | 0.4267 | 0.0001 | 0.3400 | 1.000 | 0.797 | 40.9 | 58000 | 0.0 | 0.24 | 2500 | 0.55 |
| 20 | 0.1Dy·0.9Nd | 0.40 | 0.60 | 0.1098 | 0.1098 | 0.3902 | 0.0000 | 0.3902 | 1.000 | 1.000 | 39.4 | 54000 | 1.0 | 0.22 | 2100 | 0.53 |
| 21 | 0.5Dy·0.5Nd | 0.99 | 0.01 | 0.0790 | 0.0790 | 0.4610 | 0.0100 | 0.3710 | 1.000 | 0.788 | 33.8 | 51000 | 1.4 | 0.22 | 2300 | 0.64 |
| 22 | Er | 0.50 | 0.50 | 0.0881 | 0.0881 | 0.4119 | 0.0000 | 0.4119 | 1.000 | 1.000 | 45.8 | 35000 | 26.8 | 0.28 | 2400 | 0.50 |
| 23 | 0.1Er·0.9Nd | 0.40 | 0.60 | 0.1072 | 0.1072 | 0.4376 | 0.0000 | 0.3480 | 1.000 | 0.795 | 37.5 | 51000 | 2.9 | 0.27 | 2600 | 0.60 |
| 24 | Yb | 0.80 | 0.20 | 0.0884 | 0.0884 | 0.4100 | 0.0500 | 0.3632 | 1.000 | 0.790 | 41.5 | 30000 | 20.1 | 0.23 | 7100 | 0.63 |
| 25 | 0.1Yb·0.9Nd | 0.50 | 0.50 | 0.1700 | 0.1760 | 0.3270 | 0.0000 | 0.3270 | 1.035 | 1.000 | 38.7 | 52000 | −3.6 | 0.25 | 2600 | 0.69 |
| 26 | 0.9Nd·0.1La | 0.30 | 0.70 | 0.4500 | 0.3380 | 0.1050 | 0.0000 | 0.1070 | 0.751 | 1.019 | 31.8 | 26000 | 27.9 | 0.24 | 2900 | 0.51 |
| 27 | 0.5Nd·0.5La | 0.40 | 0.60 | 0.3558 | 0.4440 | 0.1001 | 0.0000 | 0.1001 | 1.248 | 1.000 | 31.4 | 28000 | −29.9 | 0.20 | 2700 | 0.67 |
| 28 | 0.9Nd·0.1La | 0.50 | 0.50 | 0.1500 | 0.1500 | 0.2500 | 0.1000 | 0.3500 | 1.000 | 1.000 | 43.8 | 31000 | −4.5 | 0.30 | 2200 | 0.52 |

TABLE 2

| | | Ratio of Ca:Sr | | Ln₂O x | Al₂O₃ | MO | BaO | TiO₂ | | e/ | Mean Value | | τf ppm/ | Standard Deviation σ | | τf ppm/ |
|---|---|---|---|---|---|---|---|---|---|---|---|---|---|---|---|---|
| No. | Rare Earth Element Ratio | Ca | Sr | a | b | c | d | e | b/a | (c + d) | εr | Q | °C. | εr | Q | °C. |
| *29 | Y | 0.10 | 0.90 | 0.0500 | 0.0600 | 0.4000 | 0.1000 | 0.3900 | 1.200 | 0.780 | 34.5 | 12000 | 34.5 | — | — | — |
| *30 | La | 0.20 | 0.80 | 0.4550 | 0.3440 | 0.1005 | 0.0001 | 0.1004 | 0.756 | 0.998 | 26.5 | 8000 | −40.9 | — | — | — |
| *31 | Sm | 0.30 | 0.70 | 0.0660 | 0.0500 | 0.3850 | 0.1000 | 0.3990 | 0.758 | 0.823 | 28.5 | 9000 | −35.8 | — | — | — |
| *32 | Dy | 0.50 | 0.50 | 0.3100 | 0.3100 | 0.0800 | 0.1000 | 0.2000 | 1.000 | 1.111 | 24.6 | 12000 | −43.1 | — | — | — |
| *33 | Ce | 0.60 | 0.40 | 0.0570 | 0.0575 | 0.5050 | 0.0010 | 0.3795 | 1.009 | 0.750 | 29.0 | 5000 | 43.3 | — | — | — |
| *34 | Eu | 0.70 | 0.30 | 0.4000 | 0.4000 | 0.0800 | 0.0300 | 0.0900 | 1.000 | 0.818 | 26.4 | 8000 | −39.4 | — | — | — |
| *35 | Er | 0.80 | 0.20 | 0.0675 | 0.0675 | 0.2850 | 0.1000 | 0.4800 | 1.000 | 1.247 | 33.5 | 9000 | 39.8 | — | — | — |
| *36 | 0.5Nd·0.5La | 0.90 | 0.10 | 0.1600 | 0.0900 | 0.3220 | 0.0500 | 0.3780 | 0.563 | 1.016 | 30.4 | 2000 | 5.5 | — | — | — |
| *37 | 0.9Nd·0.1La | 0.10 | 0.90 | 0.1500 | 0.2600 | 0.2930 | 0.0020 | 0.2950 | 1.733 | 1.000 | 29.4 | 3000 | 1.5 | — | — | — |
| *38 | 0.5Nd·0.5La | 0.20 | 0.80 | 0.2500 | 0.2400 | 0.1880 | 0.0020 | 0.3200 | 0.960 | 1.684 | 25.1 | 3000 | −11.7 | — | — | — |
| *39 | 0.1Nd·0.9La | 0.30 | 0.70 | 0.1600 | 0.1300 | 0.4200 | 0.0400 | 0.2500 | 0.813 | 0.543 | 28.6 | 2000 | 4.0 | — | — | — |
| *40 | 0.1Y·0.9Nd | 0.50 | 0.50 | 0.1240 | 0.1300 | 0.3730 | 0.0000 | 0.3730 | 1.048 | 1.000 | 34.8 | 48000 | −28.1 | 1.21 | 3000 | 2.15 |
| *41 | La | 0.80 | 0.20 | 0.2250 | 0.2250 | 0.2750 | 0.0000 | 0.2750 | 1.000 | 1.000 | 40.0 | 50000 | 1.0 | 1.51 | 3200 | 2.61 |
| *42 | 0.1La·0.9Nd | 0.90 | 0.10 | 0.1250 | 0.1250 | 0.4170 | 0.0000 | 0.3330 | 1.000 | 0.799 | 42.2 | 48000 | −15.4 | 1.30 | 3500 | 2.85 |
| *43 | 0.5La·0.5Nd | 0.30 | 0.70 | 0.3500 | 0.3500 | 0.1500 | 0.0000 | 0.1500 | 1.000 | 1.000 | 32.4 | 59000 | −27.2 | 1.46 | 4000 | 2.63 |
| *44 | Ce | 0.50 | 0.50 | 0.1139 | 0.1061 | 0.3300 | 0.1000 | 0.3500 | 0.932 | 0.814 | 38.9 | 30000 | −1.8 | 1.82 | 2100 | 2.19 |
| *45 | 0.1Pr·0.9Nd | 0.50 | 0.50 | 0.0941 | 0.1009 | 0.4600 | 0.0000 | 0.3450 | 1.072 | 0.750 | 40.6 | 21000 | 27.5 | 1.92 | 2000 | 2.44 |
| *46 | 0.5Pr·0.5Nd | 0.70 | 0.30 | 0.0770 | 0.0770 | 0.4200 | 0.0100 | 0.4160 | 1.000 | 0.967 | 46.8 | 42000 | 28.6 | 1.07 | 2600 | 2.45 |
| *47 | 0.1Sm·0.9Nd | 0.60 | 0.40 | 0.1320 | 0.1600 | 0.3270 | 0.0000 | 0.3810 | 1.212 | 1.165 | 45.2 | 50000 | −5.4 | 1.93 | 2400 | 2.26 |
| *48 | 0.5Sm·0.5Nd | 0.50 | 0.50 | 0.1071 | 0.1090 | 0.3539 | 0.0000 | 0.4300 | 1.018 | 1.215 | 37.8 | 42000 | 10.3 | 1.25 | 2900 | 2.85 |
| *49 | 0.1Gd·0.9Nd | 0.80 | 0.20 | 0.0780 | 0.0780 | 0.4220 | 0.0000 | 0.4220 | 0.000 | 1.000 | 42.5 | 52000 | 20.4 | 1.44 | 3600 | 2.94 |
| *50 | Dy | 0.50 | 0.50 | 0.1166 | 0.1166 | 0.4267 | 0.0001 | 0.3400 | 1.000 | 0.797 | 40.9 | 58000 | 0.0 | 1.64 | 2500 | 2.62 |
| *51 | 0.1Dy·0.9Nd | 0.40 | 0.60 | 0.1098 | 0.1098 | 0.3902 | 0.0000 | 0.3902 | 1.000 | 1.000 | 39.4 | 54000 | 1.0 | 1.28 | 2900 | 2.79 |
| *52 | Er | 0.50 | 0.50 | 0.0881 | 0.0881 | 0.4119 | 0.0000 | 0.4119 | 1.000 | 1.000 | 45.8 | 30000 | 26.8 | 1.95 | 1800 | 2.12 |
| *53 | 0.1Er·0.9Nd | 0.40 | 0.60 | 0.1072 | 0.1072 | 0.4376 | 0.0000 | 0.3480 | 1.000 | 0.795 | 37.5 | 51000 | 2.9 | 1.36 | 2600 | 2.53 |
| *54 | Yb | 0.80 | 0.20 | 0.0884 | 0.0884 | 0.4100 | 0.0500 | 0.3632 | 1.000 | 0.790 | 41.5 | 30000 | 20.1 | 1.22 | 2100 | 2.14 |
| *55 | 0.1Yb·0.9Nd | 0.50 | 0.50 | 0.1700 | 0.1760 | 0.3270 | 0.0000 | 0.3270 | 1.035 | 1.000 | 38.7 | 52000 | −3.6 | 1.43 | 3600 | 2.27 |

The variation in the X-ray diffraction measurement during the above process was examined. As an example thereof, the results as to Sample Nos. 1 and 10 are shown in Tables 2 to 6.

Specifically, Tables 2 and 3 show the X-ray diffraction chart of the calcined powder A and B prepared by calcination, respectively. It can be seen from Table 2 that the calcined powder A is powder of which main crystal phase is $LaAlO_3$. It can be seen from Table 3 that the calcined powder B is powder of which main crystal phase is $SrTiO_3$.

Figure 4:
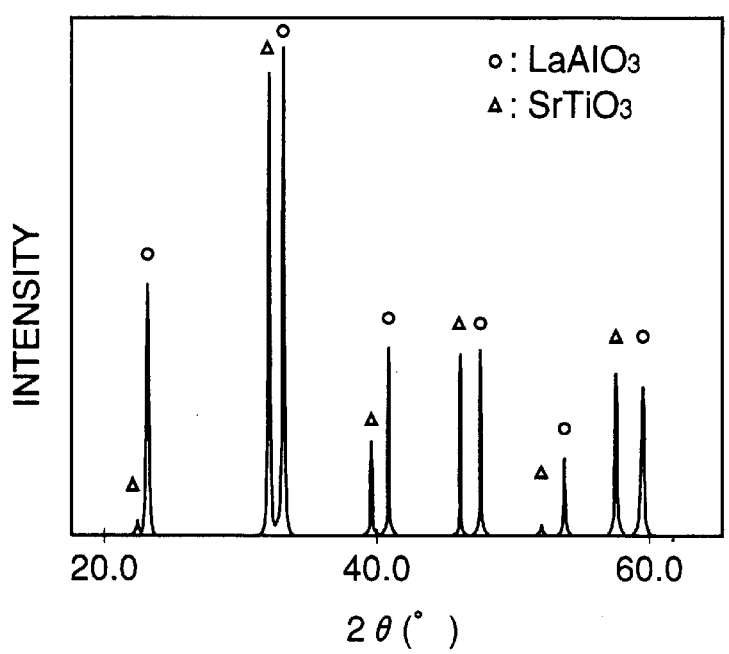
FIG. 4 is an X-ray diffraction chart of a mixed powder of a calcined powder of $LaAlO_3$ and a calcined powder of $SrTiO_3$ in the example (Sample No. 1)
Figure 5:
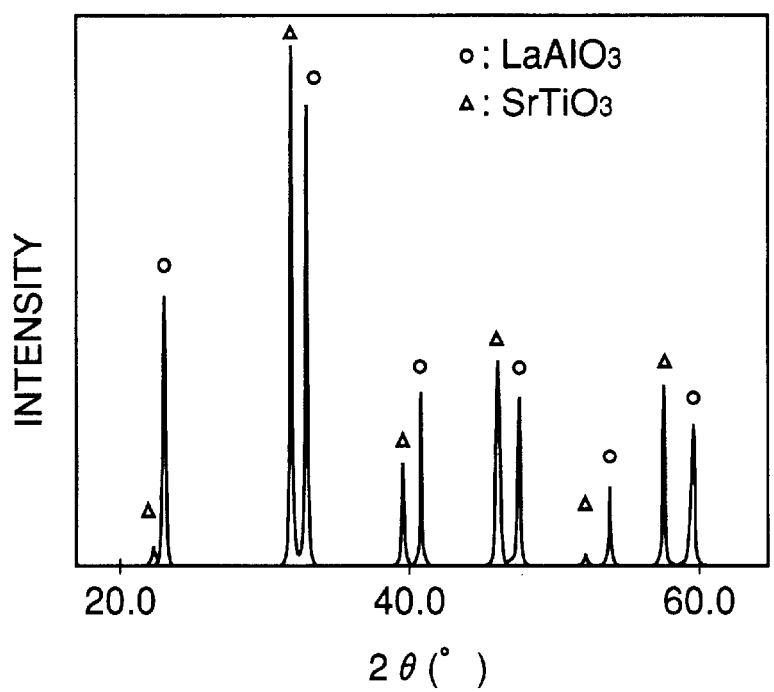
FIG. 5 is an X-ray diffraction chart of a mixed powder of a calcined powder of $LaAlO_3$ and a calcined powder of $SrTiO_3$ in the example (Sample No. 10)
Figure 6:
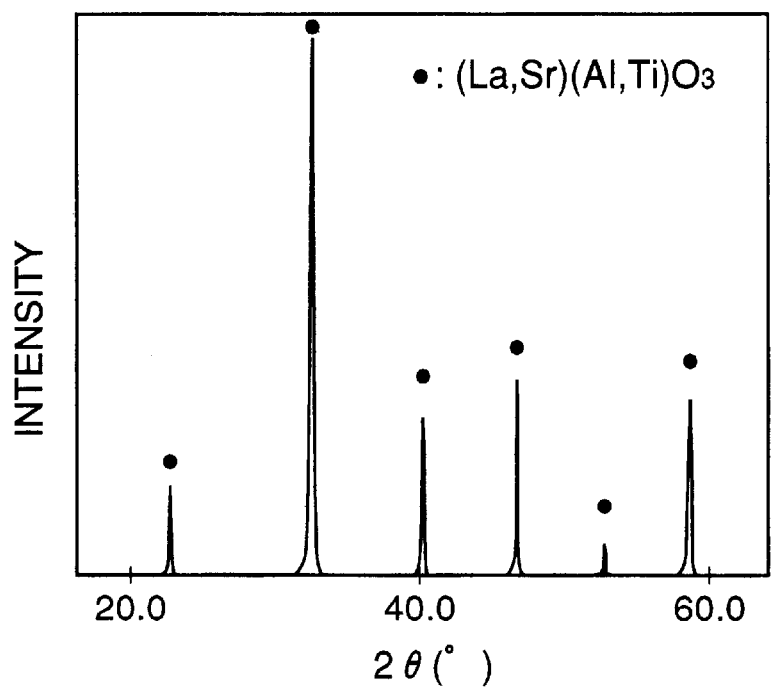
FIG. 6 is an X-ray diffraction chart of a dielectric ceramic material in the example (Sample No. 1)
Figure 7:
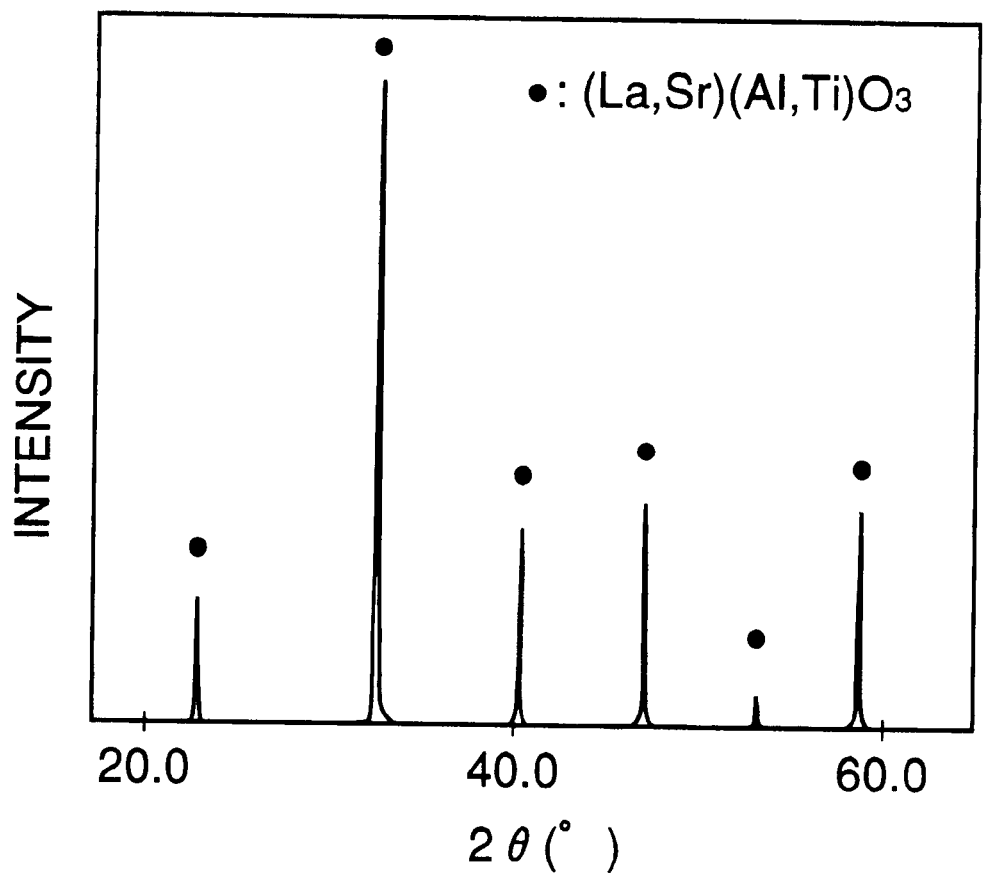
FIG. 7 is an X-ray diffraction chart of a dielectric ceramic material in the example (Sample No. 10).

Tables 4 and 5 show the X-ray diffraction charts of mixed powder which were obtained by blending the calcined powder A and B with the ratio of Sample Nos. 1 and 10, respectively. Tables 6 and 7 show the X-ray diffraction charts of dielectric ceramic materials which were obtained by firing these mixed powder shown in FIGS. 4 and 5, respectively. As seen from the results in Tables 6 and 7, between the peak location of $LaAlO_3$ and that of $SrTiO_3$, a peak of the solid solution composed of both is detected, which shows a single crystal phase formed by a perovskite-type crystal phase $(La, Sr)(Al, Ti)O_3$.

As seen from the results in Tables 1 to 3, the dielectric ceramic compositions of which constitution ratio was within the scope of the invention (Sample Nos. 1 to 28), attained excellent dielectric characteristics. That is, the dielectric constant $\in r$ was more than 30, the Q value converted to 1 GHz was more than 20,000, resonance frequency temperature coefficient $\tau f$ was within ±30 (ppm/° C.), and the standard deviations of $\in r$, Q value and $\tau f$ were within 0.3, 3000 and 0.7 ppm/° C., respectively.

On the other hand, as to the dielectric ceramic compositions of which constitution ratio was outside of the scope of the invention (Sample Nos. 29–39, and 76–82), the $\in r$ or Q value was low, or the absolute value of $\tau f$ exceeded 30.

In Sample Nos. 40 to 55 and Nos. 83 to 87 which were prepared by the simultaneous blending, each mean value of $\in r$, Q value and $\tau f$ was equivalent to that of the invention. However, the standard deviation $\sigma$ of $\in r$ was more than 1, and the standard deviation $\sigma$ of $\tau f$ was more than 2 ppm/° C., resulting in a large variation. In some Comparative Examples the standard deviation $\sigma$ of Q value exceeded 3000, resulting in a large variation.

Of the products of the present invention, Sample Nos. 56 to 75 in which $0.1061 \leq a \leq 0.2162$; $0.1050 \leq b \leq 0.2086$; $0.3040 \leq c \leq 0.4185$; $0.2747 \leq e \leq 0.4373$; $0.75 \leq b/a \leq 1.25$; and $0.75 \leq e/c \leq 1.25$, attained excellent dielectric characteristics that the Q value, when it was converted into 1 GHz, was more than 40,000.

Example 2

Each of the calcined powder of ceramic compositions indicated in Tables 1 and 2 of Example 1 was blended in the weight percentage indicated in Table 4, followed by molding, firing, grinding in the same manner as Example 1. Measurement of the dielectric characteristics was conducted with respect to 30 samples, and the same test as Example 1 was conducted 30 times, and the standard deviation $\sigma$ of dielectric characteristics was calculated.

TABLE 4

| | Sample No. and Blending Ratio | | | | | | Standard Deviation $\sigma$ of Composition A + B + C | | |
|---|---|---|---|---|---|---|---|---|---|
| | A | | B | | C | | | | |
| | | Blending | | Blending | | Blending | | | |
| No. | No. | Ratio (wt. %) | No. | Ratio (wt. %) | No. | Ratio (wt. %) | $\in r$ | Q GHz | $\tau f$ ppm/C° C. |
| 88 | 1 | 20 | 2 | 30 | 3 | 50 | 0.11 | 400 | 0.12 |
| 89 | 4 | 40 | 5 | 40 | 6 | 20 | 0.19 | 600 | 0.18 |
| 90 | 7 | 10 | 8 | 30 | 9 | 60 | 0.20 | 400 | 0.13 |
| 91 | 10 | 5 | 11 | 95 | — | — | 0.16 | 300 | 0.13 |
| 92 | 12 | 20 | 13 | 80 | — | — | 0.13 | 1000 | 0.12 |
| 93 | 14 | 30 | 15 | 70 | — | — | 0.18 | 600 | 0.18 |
| 94 | 16 | 40 | 17 | 60 | — | — | 0.14 | 500 | 0.17 |
| 95 | 18 | 50 | 19 | 50 | — | — | 0.17 | 900 | 0.15 |
| 96 | 20 | 60 | 21 | 40 | — | — | 0.13 | 500 | 0.12 |
| 97 | 22 | 70 | 23 | 30 | — | — | 0.12 | 800 | 0.20 |
| 98 | 24 | 95 | 25 | 5 | — | — | 0.19 | 800 | 0.15 |
| 99 | 26 | 90 | 27 | 5 | 28 | 5 | 0.18 | 700 | 0.16 |

As a result, in all Samples 88 to 99, the dielectric constant $\in r$ was more than 30, and Q value when it was converted into 1 GHz, was more than 20,000. As seen from Table 4, the standard deviations of $\in r$, Q value and $\tau f$ were within 0.2, 1000 and 0.2 ppm/° C., respectively. This permitted a smaller variation than Example 1.

All the dielectric ceramic materials obtained in Example 2 were subjected to an X-ray diffraction measurement, which showed that they were all composed of a single crystal phase formed by a perovskite-type crystal phase.

Example 3

The respective powder of lanthanum oxide $(La_2O_3)$, aluminum oxide $(Al_2O_3)$, strontium carbonate $(SrCO_3)$ and titanium oxide $(TiO_2)$ were weighed so as to have the mole ratio shown in Table 5. A pure water was added thereto, and the mixture was blended and milled in wet process by means of a mill using $ZrO_2$ balls, for about 20 hours, until the mixture had a mean particle diameter of 2.0 $\mu m$ or smaller.

The resultant mixture was dried and calcined at 1200° C. for two hours. Subsequently, to 100 parts by weight of the calcined body (the main constituent), a $MnO_2$ powder was added in the ratio (parts by weight) shown in Table 5, and a 5% by weight of a binder was added and granulated. The resultant powder was molded into a disk shape, at a pressure of about 1 ton/cm$^2$, which was then subjected to a binder-removing treatment in the air atmosphere at a temperature of 800° C. and a retention time of 10 hours, thereafter, fired in the air atmosphere at a temperature of 1500 to 1700° C. for two hours, thereby to obtain a dielectric ceramic material.

By using the resultant materials, the dielectric constant ∈r, Q value and resonance frequency temperature coefficient τf were measured at a measuring frequency of 3.5 to 4.5 GHz, in the same manner as Example 1. As to Q value, that at 120° C. was also measured, and the ratio of Q value at 120° C. to Q value at room temperature (25° C.) was calculated as the retention of Q value. The carbon content was determined by infrared absorption method with a tubular resistance furnace. The results are shown in Table 5.

was more than 30,000, resonance frequency temperature coefficient τf was within ±30 (ppm/° C.), and the retention of Q value at 120° C. to Q value at 25° C. was more than 75%.

Example 4

To 100 parts by weight of the same main constituent as that of Sample Nos. 101, 110 and 113 in Table 5, a $MnO_2$ powder was added in different ratios shown in Table 6, and

TABLE 5

| | $La_2O_3$ | $Al_2O_3$ | SrO | $TiO_2$ | | | $MnO_2$ | Carbon Content | Dielectric Constant | Q Value | | τf |
|---|---|---|---|---|---|---|---|---|---|---|---|---|
| No. | a | b | c | d | b/a | d/c | (pbw) | (wt. %) | ∈r | GHz | Retention (%) | ppm/° C. |
| 101 | 0.1623 | 0.1623 | 0.3377 | 0.3377 | 1.0000 | 1.0000 | 1.00 | 0.010 | 37 | 77000 | 81.6 | −13 |
| 102 | 0.1307 | 0.1597 | 0.3548 | 0.3548 | 1.2219 | 1.0000 | 1.00 | 0.008 | 38 | 51000 | 80.2 | 5 |
| 103 | 0.2105 | 0.1688 | 0.346 | 0.2747 | 0.8019 | 0.7939 | 1.00 | 0.008 | 31 | 56500 | 75.4 | −27 |
| 104 | 0.1382 | 0.1438 | 0.3769 | 0.3411 | 1.0405 | 0.905 | 1.00 | 0.010 | 38 | 59800 | 79.2 | 2 |
| 105 | 0.1707 | 0.2086 | 0.346 | 0.2747 | 1.222 | 0.7939 | 1.00 | 0.006 | 33 | 61700 | 81.8 | −23 |
| 106 | 0.1061 | 0.1061 | 0.3939 | 0.3939 | 1.0000 | 1.0000 | 1.00 | 0.008 | 45 | 52200 | 80.1 | 30 |
| 107 | 0.1801 | 0.1444 | 0.304 | 0.3715 | 0.8018 | 1.222 | 1.00 | 0.010 | 38 | 58600 | 78.8 | −4 |
| 108 | 0.1452 | 0.1452 | 0.3956 | 0.314 | 1.0000 | 0.7937 | 1.00 | 0.006 | 34 | 47400 | 79.1 | −7 |
| 109 | 0.1163 | 0.1259 | 0.4092 | 0.3486 | 1.0825 | 0.8519 | 1.00 | 0.004 | 38 | 56500 | 80.9 | 21 |
| 110 | 0.1211 | 0.1211 | 0.3789 | 0.3789 | 1.0000 | 1.0000 | 1.00 | 0.010 | 43 | 59800 | 84.4 | 16 |
| 111 | 0.1276 | 0.1383 | 0.3597 | 0.3744 | 1.0839 | 1.0409 | 1.00 | 0.001 | 43 | 49000 | 83.4 | 11 |
| 112 | 0.2162 | 0.1631 | 0.3041 | 0.3166 | 0.7543 | 1.0411 | 1.00 | 0.002 | 35 | 48900 | 78.1 | −22 |
| 113 | 0.141 | 0.141 | 0.359 | 0.359 | 1.0000 | 1.0000 | 1.00 | 0.001 | 39 | 68600 | 84.5 | 1 |
| 114 | 0.1707 | 0.2086 | 0.3166 | 0.3041 | 1.222 | 0.9605 | 1.00 | 0.006 | 32 | 47800 | 77.7 | −19 |
| 115 | 0.1071 | 0.105 | 0.3506 | 0.4373 | 0.9804 | 1.2473 | 1.00 | 0.004 | 46 | 49400 | 76.1 | 28 |
| 116 | 0.1125 | 0.1375 | 0.4125 | 0.3375 | 1.2222 | 0.8182 | 1.00 | 0.006 | 35 | 50200 | 80.4 | 18 |
| 117 | 0.1515 | 0.11143 | 0.4185 | 0.3157 | 0.7545 | 0.7544 | 1.00 | 0.010 | 35 | 58900 | 80.6 | 3 |
| 118 | 0.1329 | 0.1658 | 0.3121 | 0.3892 | 1.2476 | 1.247 | 1.00 | 0.010 | 39 | 54800 | 79.1 | 1 |
| 119 | 0.1897 | 0.1897 | 0.3103 | 0.3103 | 1.0000 | 1.0000 | 1.00 | 0.008 | 35 | 78100 | 76.8 | −28 |
| 120 | 0.1308 | 0.1114 | 0.3979 | 0.3599 | 0.8517 | 0.9045 | 1.00 | 0.008 | 39 | 53200 | 83.4 | 11 |
| *121 | 0.1944 | 0.1944 | 0.3056 | 0.3056 | 1.0000 | 1.0000 | 1.00 | 0.010 | 34 | 81000 | 81.9 | −30 |
| *122 | 0.1631 | 0.2162 | 0.2669 | 0.3538 | 1.3256 | 1.3256 | 1.00 | 0.008 | 35 | 28400 | 76.7 | −32 |
| *123 | 0.1061 | 0.1061 | 0.4392 | 0.3486 | 1.0000 | 0.7937 | 1.00 | 0.010 | 40 | 17300 | 79.8 | 31 |
| *124 | 0.2143 | 0.2143 | 0.2857 | 0.2.857 | 1.0000 | 1.0000 | 1.00 | 0.010 | 31 | 73800 | 81.1 | −47 |
| *125 | 0.1229 | 0.1843 | 0.3464 | 0.3464 | 1.4996 | 1.0000 | 1.00 | 0.008 | 37 | 13900 | 80.8 | 13 |
| *126 | 0.1453 | 0.0969 | 0.3789 | 0.3789 | 0.6669 | 1.0000 | 1.00 | 0.006 | 43 | 14900 | 81.3 | 31 |
| *127 | 0.1915 | 0.1878 | 0.3724 | 0.2483 | 0.9807 | 0.6668 | 1.00 | 0.008 | 26 | 53200 | 79.8 | −32 |
| *128 | 0.0874 | 0.0891 | 0.3294 | 0.4941 | 1.0194 | 1.500 | 1.00 | 0.004 | 63 | 8540 | 77.4 | 53 |
| *129 | 0.1536 | 0.1536 | 0.2771 | 0.4157 | 1.0000 | 1.5002 | 1.00 | 0.006 | 43 | 10200 | 78.9 | −32 |
| *130 | 0.0882 | 0.0882 | 0.4118 | 0.4118 | 1.0000 | 1.0000 | 1.00 | 0.008 | 52 | 20000 | 80.7 | 55 |
| *131 | 0.1061 | 0.1061 | 0.3388 | 0.449 | 1.0000 | 1.3253 | 1.00 | 0.010 | 49 | 15900 | 81.7 | 44 |
| *132 | 0.1623 | 0.1623 | 0.3377 | 0.3377 | 1.0000 | 1.0000 | 1.00 | 0.008 | 39 | 35700 | 76.6 | −17 |
| *133 | 0.1623 | 0.1623 | 0.3377 | 0.3377 | 1.0000 | 1.0000 | 1.00 | 0.006 | 37 | 33000 | 77.8 | −19 |
| *134 | 0.1623 | 0.1623 | 0.3377 | 0.3377 | 1.0000 | 1.0000 | 1.00 | 0.008 | 35 | 31100 | 78.1 | −26 |

*132: a = Nd2O3  b = Al2O3  c = CaO  d = TiO2,
*133: a = Nd2O3  b = Al2O3  c = SrO  d = TiO2,
*134: a = La2O3  b = Al2O3  c = CaO  d = TiO2
Mark "*" indicates Sample not falling within the range of the invention, and "pbw" means "parts by weight".

As seen from Table 5, in Sample Nos. 122 to 134, which were the dielectric ceramic compositions not falling within the scope of the invention, the dielectric constant ∈r or Q value was low, or the absolute value of τf exceeded 30.

On the other hand, Sample Nos. 101 to 121, which were the dielectric ceramic compositions of the invention, attained excellent dielectric characteristics that the dielectric constant ∈r was more than 30, Q value converted to 1 GHz ceramic materials were prepared in the same manner as Example 3. The dielectric constant ∈r, Q value, resonance frequency temperature coefficient τf, and the retention of Q value, were measured with respect to the resultant ceramic materials. The results are shown in Table 6.

TABLE 6

| | $MnO_2$ Content | Dielectric Constant | Q Value | | | τf | |
|---|---|---|---|---|---|---|---|
| No. | (pbw) | ∈r | 25° C. | 120° C. | Retention (%) | ppm/° C. | Remarks |
| *135 | — | 37 | 72000 | 52100 | 72.4 | −12 | Added to |
| 136 | 0.01 | 37 | 74600 | 61700 | 82.7 | −12 | Sample No. 101 |

TABLE 6-continued

| No. | MnO$_2$ Content (pbw) | Dielectric Constant $\epsilon r$ | Q Value 25° C. | Q Value 120° C. | Retention (%) | $\tau f$ ppm/° C. | Remarks |
|---|---|---|---|---|---|---|---|
| 137 | 0.05 | 37 | 74900 | 62000 | 82.8 | −12 | |
| 138 | 0.10 | 37 | 75200 | 63000 | 83.8 | −12 | |
| 139 | 1.50 | 37 | 76400 | 62400 | 81.7 | −12 | |
| 140 | 2.40 | 38 | 75600 | 61100 | 80.8 | −11 | |
| 141 | 3.00 | 38 | 73900 | 58500 | 79.2 | −11 | |
| *142 | 3.20 | 39 | 69800 | 50700 | 72.6 | −10 | |
| *143 | — | 43 | 55000 | 39700 | 72.2 | 17 | Added to |
| 144 | 0.01 | 43 | 56900 | 47900 | 84.2 | 17 | Sample No. 110 |
| *145 | 0.05 | 43 | 57100 | 48600 | 85.1 | 17 | |
| 146 | 0.10 | 43 | 58300 | 50700 | 87.0 | 17 | |
| 147 | 1.50 | 43 | 58800 | 49500 | 84.2 | 18 | |
| 148 | 2.40 | 44 | 56500 | 46800 | 82.8 | 18 | |
| 149 | 3.00 | 44 | 56100 | 45100 | 80.4 | 18 | |
| *150 | 3.20 | 44 | 53800 | 38900 | 72.3 | 19 | |
| *151 | — | 39 | 66500 | 47000 | 70.7 | 1 | Added to |
| 152 | 0.01 | 39 | 67000 | 56000 | 83.6 | 1 | Sample No. 113 |
| 153 | 0.05 | 39 | 67200 | 58000 | 86.3 | 1 | |
| 154 | 0.10 | 39 | 67900 | 59700 | 87.9 | 1 | |
| 155 | 1.50 | 39 | 68000 | 57000 | 83.8 | 1 | |
| 156 | 2.40 | 40 | 67400 | 54500 | 80.9 | 2 | |
| 157 | 3.00 | 40 | 66900 | 53600 | 80.1 | 2 | |
| *158 | 3.20 | 40 | 64700 | 45500 | 70.3 | 2 | |

Mark "*" indicates Sample not falling within the range of the invention and "pbw" means "parts by weight".

It can be seen from Table 6 that the addition of 0.01 to 3.0 parts by weight of MnO$_2$ enables to provide a stable higher Q value than Sample No. 131 with no addition of Mn, and to increase the retention of Q value at a high temperature (120° C.) to that at room temperature (25° C.).

Example 5

A plurality of ceramic materials of different carbon contents were prepared in the same manner as Example 3, except that in Sample Nos. 101, 110 and 113 in Table 5, the temperature and time of a binder-removing treatment were changed to those shown in Table 7. The dielectric constant $\epsilon r$, Q value, resonance frequency temperature coefficient $\tau f$, and the retention of Q value of the resultant ceramic materials, were measured in the same manner as Example 1. The results are shown in Table 7.

TABLE 7

| No. | Binder-Removing Condition Temp. (° C.) | Binder-Removing Condition Time (hr.) | Carbon Content (wt/%) | Dielectric Constant $\epsilon r$ | Q Value 25° C. | Q Value 120° C. | Retention (%) | $\tau f$ ppm/° C. | Remarks |
|---|---|---|---|---|---|---|---|---|---|
| 159 | 800 | 15 | 0.002 | 37 | 79800 | 67900 | 85.1 | −12 | Added to |
| 160 | 800 | 10 | 0.004 | 37 | 79100 | 67000 | 84.7 | −12 | Sample No. 101 |
| 161 | 600 | 10 | 0.006 | 37 | 78700 | 67200 | 85.4 | −12 | |
| 162 | 400 | 20 | 0.008 | 37 | 77900 | 64300 | 82.5 | −12 | |
| 163 | 400 | 10 | 0.010 | 37 | 77000 | 62800 | 81.6 | −12 | |
| 164 | 600 | 3 | 0.015 | 38 | 72100 | 52800 | 73.2 | −11 | |
| 165 | 400 | 9 | 0.020 | 38 | 70500 | 48700 | 69.1 | −11 | |
| 166 | 400 | 5 | 0.025 | 38 | 62900 | 42000 | 66.8 | −10 | |
| 167 | 800 | 15 | 0.002 | 43 | 64300 | 56500 | 87.9 | 16 | Added to |
| 168 | 800 | 10 | 0.004 | 43 | 64000 | 54800 | 85.6 | 16 | Sample No. 110 |
| 169 | 600 | 10 | 0.006 | 43 | 61700 | 52000 | 84.3 | 16 | |
| 170 | 400 | 20 | 0.008 | 43 | 59800 | 49900 | 83.4 | 16 | |
| 171 | 400 | 10 | 0.010 | 43 | 59800 | 50500 | 84.4 | 16 | |
| 172 | 600 | 3 | 0.015 | 44 | 57600 | 42900 | 74.5 | 16 | |
| 173 | 400 | 9 | 0.020 | 44 | 54900 | 40000 | 72.9 | 17 | |
| 174 | 400 | 5 | 0.025 | 44 | 49400 | 33900 | 68.6 | 17 | |
| 175 | 800 | 15 | 0.002 | 39 | 74600 | 63900 | 85.7 | 1 | Added to |
| 176 | 800 | 10 | 0.004 | 39 | 73800 | 62900 | 85.2 | 1 | Sample No. 113 |
| 177 | 600 | 10 | 0.006 | 39 | 71900 | 61000 | 84.8 | 1 | |
| 178 | 400 | 20 | 0.008 | 39 | 69900 | 59100 | 84.5 | 1 | |
| 179 | 400 | 10 | 0.010 | 39 | 68000 | 58000 | 84.5 | 1 | |
| 180 | 600 | 3 | 0.015 | 40 | 67400 | 49900 | 74.0 | 2 | |
| 181 | 400 | 9 | 0.020 | 40 | 62800 | 44500 | 70.9 | 2 | |

TABLE 7-continued

| No. | Binder-Removing Condition | | Carbon Content (wt/%) | Dielectric Constant εr | Q Value | | | τf ppm/°C. | Remarks |
|---|---|---|---|---|---|---|---|---|---|
| | Temp. (°C.) | Time (hr.) | | | 25°C. | 120°C. | Retention (%) | | |
| 182 | 400 | 5 | 0.025 | 41 | 58200 | 39900 | 68.6 | 3 | |

It can be seen from Table 7 that, as compared to the case that the carbon content in the ceramic material is more than 0.02% by weight, when it is not more than 0.02% by weight, Q value is higher and stabilized, and the retention of Q value at a high temperature (120° C.) to Q value at room temperature (25° C.) is further improved.

What is claimed is:

1. A dielectric ceramic composition wherein a main crystal phase is a perovskite crystal phase, comprising a complex oxide which contains, as a metal element, at least a rare earth element, Al, Sr, and Ti, and which is represented, at a mole ratio of the metal element, by the following composition formula:

$$aLn_2O_xbAl_2O_3cSrOdBaOeTiO_2 \quad (1)$$

wherein Ln is a rare earth element; and $3 \leq x \leq 4$, and a, b, c, d and e satisfying the following equations:
 $0.056 \leq a \leq 0.450$;
 $0.056 \leq b \leq 0.460$;
 $0.100 \leq c \leq 0.500$;
 $0.100 \leq e \leq 0.470$;
 $0.75 \leq b/a \leq 25$;
 $0.756 \leq e/(c+d) \leq 1.25$; and
 $a+b+c+d+e=1$.

2. The composition according to claim 1, which is substantially composed of a perovskite crystal phase.

3. The composition according to claim 1, wherein the perovskite crystal phase comprises a solid solution of $LnAlO_{(x+3)/2}$ wherein Ln is a rare earth element; and $3 \leq x \leq 4$, and $RTiO_3$ wherein R is an alkaline earth metal containing at least Sr.

4. A dielectric ceramic composition comprising a main composition which comprises a complex oxide containing, as a metal element, at least a rare earth element, Al, Sr, alternatively, Sr and Ca, and Ti, and represented by the following composition formula:

$$aLn_2O_xbAl_2O_3cMOdBaOeTiO_2 \quad (1)$$

wherein Ln is a rare earth element; M is Sr, alternatively, Sr and Ca; and $3 \leq x \leq 4$, a, b, c, d and e satisfying the following equations:
 $0.056 \leq a \leq 0.450$;
 $0.056 \leq b \leq 0.450$;
 $0.100 \leq c \leq 0.500$;
 $0.001 \leq d \leq 0.100$;
 $0.100 \leq e \leq 0.470$;
 $0.75 \leq b/a \leq 1.25$;
 $0.75 \leq e/(c+d) \leq 1.25$; and
 $a+b+c+d+e=1$, and Mn which is contained, in terms of $MnO_2$, in an amount of 0.01 to 3 parts by weight, to 100 parts by weight of the main composition.

5. A dielectric ceramic composition comprising a main composition having a complex oxide which contains, as a metal element, at least La, Al, Sr and Ti and is represented at a mole ratio by the following composition formula:

$$aLa_2O_3bAl_2O_3cSrOeTiO_2 \quad (2)$$

wherein a, b, c and e satisfy the following equations:
 $0.1061 \leq a \leq 0.2162$;
 $0.1050 \leq b \leq 0.2086$;
 $0.3040 \leq c \leq 0.4185$;
 $0.2747 \leq e \leq 0.4373$;
 $0.75 \leq b/a \leq 1.25$;
 $0.75 \leq e/c \leq 1.25$; and
 $a+b+c+e=1$;

and Mn which is contained, in terms of $MnO_2$, in an amount of 0.01 to 3 parts by weight, to 100 parts by weight of the main composition.

6. The composition according to claim 4, wherein the carbon content in the entire amount of the composition is not more than 0.02% by weight.

7. The composition according to claim 4, wherein the ratio of Q value at 120° C. to Q value at 25° C. is more than 75%.

8. A method of preparing the dielectric ceramic material of claim 1 wherein a main crystal phase is a perovskite crystal phase comprising a solid solution of $LnAlO_{(x+3)/2}$ (Ln is a rare earth element, and $3 \leq x \leq 4$) and $RTiO_3$ (R is an alkaline earth metal containing at least Sr), the method comprising the steps of:

blending a calcined powder of which a main crystal phase is $LnAlO_{(x+3)/2}$ and a calcined powder of which a main crystal phase is $RTiO_3$;

molding the resultant mixture; and firing the resultant molding body.

9. A dielectric resonator to be operated by electromagnetic coupling, which comprises a dielectric ceramic material comprising a dielectric ceramic composition according to claim 1, and a pair of input and output terminals disposed on the sides of the dielectric ceramic material.

10. A dielectric resonator to be operated by electromagnetic coupling, which comprises a dielectric ceramic material comprising a dielectric ceramic composition according to claim 4, and a pair of input and output terminals disposed on the sides of the dielectric ceramic.

* * * * *